United States Patent
Henneken et al.

(10) Patent No.: US 6,801,845 B2
(45) Date of Patent: Oct. 5, 2004

(54) METHOD FOR CONTROLLING AN AUTOMATIC TRANSMISSION FOR A MOTOR VEHICLE

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/275,133

(22) PCT Filed: Apr. 28, 2001

(86) PCT No.: PCT/EP01/04813

§ 371 (c)(1),
(2), (4) Date: Oct. 31, 2002

(87) PCT Pub. No.: WO01/83252

PCT Pub. Date: Nov. 8, 2001

(65) Prior Publication Data

US 2003/0139868 A1 Jul. 24, 2003

(30) Foreign Application Priority Data

May 4, 2000 (DE) .......................................... 100 21 770

(51) Int. Cl.[7] ............................................. G06F 17/00
(52) U.S. Cl. ................................ 701/56; 701/65; 477/9
(58) Field of Search ............................. 701/93, 95, 55, 701/65, 56; 477/9

(56) References Cited

U.S. PATENT DOCUMENTS

| 4,463,822 A | 8/1984 | Tanigawa et al. ............ 180/177 |
| 4,560,024 A | 12/1985 | Noda et al. .................. 180/176 |
| 5,036,936 A | 8/1991 | Kawano et al. .............. 180/179 |
| 5,038,880 A | 8/1991 | Matsuoka et al. ........... 180/179 |
| 5,148,721 A * | 9/1992 | Anan et al. .................... 701/53 |
| 5,154,250 A * | 10/1992 | Murai .......................... 180/179 |
| 5,201,381 A | 4/1993 | Neuffer et al. ............... 180/179 |
| 5,549,525 A * | 8/1996 | Wendel .......................... 477/93 |
| 5,716,301 A | 2/1998 | Wild et al. ...................... 477/97 |
| 5,758,306 A * | 5/1998 | Nakamura ..................... 701/93 |
| 5,794,735 A | 8/1998 | Sigl ............................. 180/170 |
| 5,806,009 A | 9/1998 | Horiguchi ...................... 701/58 |
| 5,832,400 A | 11/1998 | Takahashi et al. ............. 701/53 |
| 6,188,949 B1 | 2/2001 | Hahn et al. .................... 701/93 |
| 6,311,118 B1 * | 10/2001 | Ito et al. ........................ 701/95 |
| 6,350,216 B1 | 2/2002 | Speicher et al. .............. 477/37 |
| 6,374,173 B1 * | 4/2002 | Ehlbeck ....................... 701/93 |

FOREIGN PATENT DOCUMENTS

| DE | 39 30 911 A1 | 3/1990 | .......... B60K/31/00 |
| DE | 40 37 248 A1 | 5/1992 | .......... B60K/31/00 |
| DE | 43 38 399 A1 | 5/1995 | .......... B60K/31/00 |
| DE | 195 28 625 A1 | 2/1997 | .......... F16H/59/18 |
| DE | 196 00 734 A1 | 7/1997 | .......... B60R/16/02 |
| DE | 196 11 502 A1 | 9/1997 | .......... B60K/31/00 |
| DE | 196 38 511 A1 | 3/1998 | .......... B60K/31/00 |
| DE | 198 21 803 A1 | 11/1999 | .......... B60K/31/00 |
| DE | 199 29 693 A1 | 11/2000 | .......... F16H/59/06 |
| EP | 0 268 686 A1 | 6/1988 | .......... F16H/5/40 |
| EP | 0 284 001 A2 | 9/1988 | .......... B60K/31/10 |
| EP | 1 053 903 A2 | 11/2000 | .......... B60K/31/00 |
| JP | 02216328 | 8/1990 | .......... B60K/31/00 |
| JP | 02274635 | 11/1990 | .......... B60K/31/00 |
| JP | 03273938 | 12/1991 | .......... B60K/31/06 |
| JP | 4-337161 A | 11/1992 | .......... F16H/61/10 |

* cited by examiner

Primary Examiner—Michael J. Zanelli
(74) Attorney, Agent, or Firm—Davis & Bujold, P.L.L.C.

(57) ABSTRACT

A method for control of an automatic transmission for a motor vehicle equipped with cruise control consists in that during cruise control of the transmission control changes to a separate driving program which is function of external influences, especially of the road inclination. This driving program is updated according to external influences. In the "set" state, change is made to the separate driving program and in the "restore" state the control can be adjusted so that the separate driving program be activated immediately or not until reaching the "set" control state.

9 Claims, 1 Drawing Sheet

METHOD FOR CONTROLLING AN AUTOMATIC TRANSMISSION FOR A MOTOR VEHICLE

FIELD OF THE INVENTION

The invention relates to a method for controlling an automatic transmission for a motor vehicle which is equipped with a cruise control wherein upon manual activation by the driver of the cruise control in the state "set" a change is made to a driving program for keeping constant the velocity of the motor vehicle existing at the activation which is given up and the motor vehicle is decelerated automatically or by the driver or accelerated by the driver whereby the cruise control passes over to the state "restore".

BACKGROUND OF THE INVENTION

Cruise controls are being used with increasing frequency in modern motor vehicles for improving the driving comfort. During the driving operation the driver adjusts a specific velocity value in the state "set" of the cruise control, the velocity being kept at this nominal value. An engine control and a brake control can be used here. When the driver actuates the brake or the throttle pedal, the control operation is terminated, the cruise control passing over to the state "restore". At a later moment the driver can activate the velocity value last adjusted again to push-button pressure and let the nominal velocity control.

When using an adaptive cruise control such as known by the designation ACC(adaptive cruise control), the motor vehicle is automatically decelerated when falling below a certain distance to a previously operating object. When sufficient distance exists between object and motor vehicle, the initial state is automatically restored, that is, the motor vehicle is accelerated. The "restoring" thus is not triggered by the driver but by the ACC.

Numerous methods for cruise control, the same as numerous cruise controllers, have become known. DE A 40 37 248 thus describes a cruise control device for a motor vehicle which is equipped with a prime mover and with a transmission controlled by an electronic control device. An electronic cruise control acts upon the prime mover, the engine torque being changed by an actuator according to the control divergence. By other control means acting upon the cruise control by engagement in the control of the transmission during presettable marginal conditions, it can be obtained that the cruise control be effectively limited even in sliding operation, specially in case of a vehicle heavily loaded or equipped with trailer while descending a steep hill.

Therefore, it is proposed here an assistance of the cruise control with which at least one downshift to a lower gear and/or the closing of a converter clutch are triggered. Thereby an adequate gear for the cruise control can be selected even when ascending and descending. But this method is extremely costly, specially when adapted to different vehicles.

In DE A 43 38 399 has been described a method and device for control of a vehicle wherein the engine power can be controlled by a first control unit. The braking power is controlled by a second control unit. Both control units operate together toward a cruise control or a cruise control limitation. Based on at least one of the variables rotational speed, velocity, acceleration, amount of fuel injected and/or throttle valve position, it is assessed whether a withdrawal of the engine power suffices in order to keep a nominal velocity. The second control unit optionally increases the braking power.

The first control unit can here be an electronic throttle pedal, a device for determining the amount of fuel, or an electronic diesel control. The second control unit can be the ABS control device and/or an ASR control device. A control of the transmission is not indicated in this prior publication.

DE A 196 00 734 describes a method for control of aggregates and/or systems of a motor vehicle while processing information for detecting the driving environment, the driving mode, for determining the position, or the like wherein actual data and/or data carried in the vehicle and/or data deduced by the driver-vehicle system are interlinked and processed to form a regulated quantity with which are influenced in their mode of operation at least a single aggregate and/or a system of the vehicle. Actual data for determining the position by means of a GPS (=global positioning system) can be interlinked with static data carried in the vehicle and processed to form a regulated quantity with which at least one shifting program of an automatic transmission is adapted and/or activated and/or varied. The object sought hereby is to facilitate the travel to the driver of a motor vehicle, mainly in special situations or driving environments. To these mainly belong assistance during orientation, for example, in city traffic, indications which spare him unpleasantnesses such as time losses due to a bottle neck, the same as technical assistance in critical situations such as on snow and ice. A cruise control is not expressly provided here.

The Applicant's patent application DE 199 29 693.6 has disclosed the operating strategy of a continuously variable transmission where the driver can simulate via manual engagement the operating behavior of a stepped transmission. By means of a velocity standard the ratio of the transmission is controlled so that a nominal velocity be maintained. A cruise control is neither needed nor described here as added aggregate. In the case of stepped automatic machines the method substantially corresponds to the selection of a shifting program in the mode of the cruise control. Here has not been mentioned taking into account the road inclination in the velocity standard.

The problem on which this invention is based is to propose a method for control of an automatic transmission for a motor vehicle with a cruise control which makes possible an easy and flexible coordination of transmission and converter characteristic lines with the control states of the cruise control and in which the driving program is coordinated by means of an easy manipulation according to external influences, specially the road inclination.

SUMMARY OF THE INVENTION

It is, therefore, provided according to the invention that the transmission control, when activating the cruise control "tempomat", be changed to a separate driving program that is a function of the external influences upon the motor vehicle, especially the road inclination, and a function of a preset driving mode and is selected from a group of driving programs. A driving program contains here all the needed gear shift characteristic lines and converter characteristic lines for a specific driving mode, that is, a sport mode, an economic mode, a mountain mode, a winter mode, etc. The selected driving mode is selected according to the established road inclination (hill, level, inclined) and is updated as needed. When the driver deactivates the cruise control, the latter enters, like in the known cruise controls, in the state "restore". According to the invention, the transmission control can now be adjusted so that the cruise control results immediately, and therewith the selection of an adequate driving program, as a function of external influences, or does not result until the cruise control has changed over to the state "set".

Together with the advantage of an easy and flexible coordination of transmission and converter characteristic lines with the control states of the cruise control or of the appertaining cruise control, there is also attained the advantage that the driving program used can have between the upshift and downshift characteristic lines a sufficient hysteresis to prevent shifting frequencies; a reduction of the hysteresis is only required when driving uphill unlike when driving downhill in order to make available enough traction for the vehicle.

When the cruise control is activated, which is manually done by the driver, there accordingly results an access to a number of specially laid out driving programs with a superimposed mountain detection as long as the cruise control is active. This offers advantages specially in case of weakly motorized vehicles in uphill driving, since when the cruise control is active damages to drive performance can be prevented, the same as undesired double downshifts and oscillating gear shifts.

The mountain can be detected here by a tractional resistance calculation known per se, via a pitch sensor, or via a GPS (=global positioning system). A superposition of the driving programs by special functions concerning, for example, a warming up, is also possible.

The driving activity calculation runs on line actively in the background during activated cruise control without exerting direct effect upon the choice of the driving program and thus of the appertaining shifting characteristic lines. This offers advantages when the cruise control is deactivated.

A possible transfer functionality during the deactivation of the cruise control consists in a jump to a fixed, pre-defined driving program; this can be the retention of the last activated driving program while the cruise control still is active, or a jump to the last current, closest, optionally somewhat economic normal program in the operation or the cruise control, or a jump to a driving program according to the driving activity running on line in the operation of the cruise control plus superimposed pitch calculation and optionally special functions.

In general, it can be said that the blank of the driver activity occurs when preserving the flexibility of several driving programs and the shifting characteristic lines thereof for reaction to external influences upon the vehicle. This means that the use of the inventively developed cruise control is not limited only to manual operation but can also be used in the ACC operation.

BRIEF DESCRIPTION OF THE DRAWING

The invention will now be described, by way of example, with reference to the accompanying drawings in which.

DETAILED DESCRIPTION OF THE INVENTION

Figure 1:
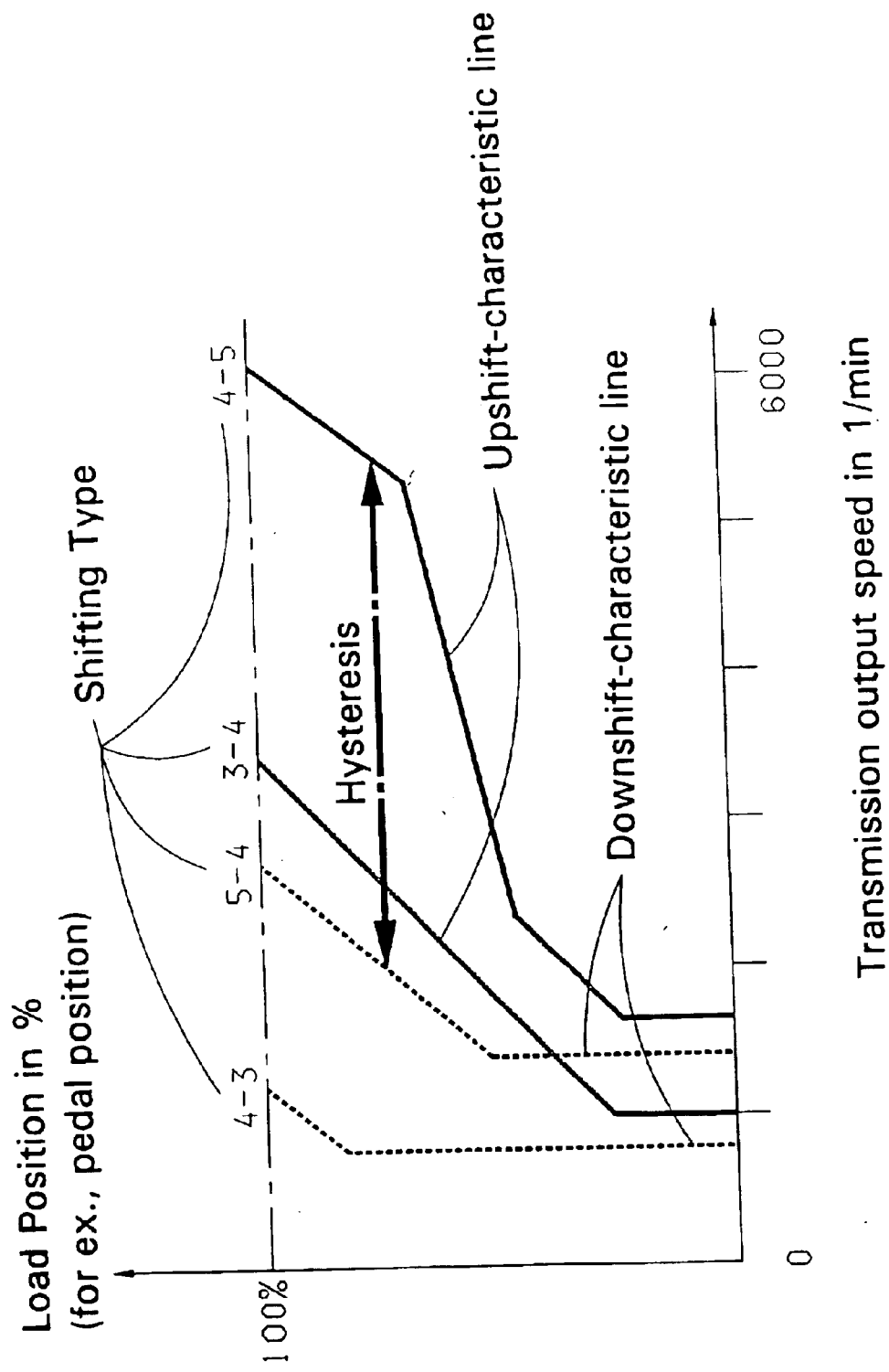
FIG. 1 is a graphic of the output rotational speed of the transmission on an ordinate pedal position.

In FIG. 1. the output rotational speed of the transmission is registered in percent on the abscissa and on the ordinate the pedal position. The shift characteristic lines belonging to the individual shifting programs are detected with the hysteresis range. Advantageous driving programs are given in the FIGURE that follows that takes into account the road inclination.

The transmission control therefore changes according to the external influences, that is, the road inclination, to one of the above separate driving programs when in the state "set" of the cruise control the driver issues a manually started command.

If the operation of the cruise control is discontinued, for example, by decelerating or accelerating the vehicle, then it changes over to the state "restore". The control now can be adjusted so that the driver immediately is going to return to one of the selected driving programs or only after having reached the target state "set" is going to activate the cruise control. This state can be triggered directly by the driver or by the ACC unit.

A variant of the inventive method for control of the automatic transmission can consist in that an additional input field "set to maximum admissible velocity" is associated with the cruise control whereby is made possible to the driver an automatic setting of the nominal velocity adapted to a directional velocity, for example, for the expressways, or an admissible velocity for city traffic, or a residential area, or a reduced velocity, for example, after a danger warning of an accident, a bottle neck, or sleet, depending on the actual position of the road. The nominal velocity is detected here by an information system such as a GPS or an RDS which delivers environmental information about the kind of road and other important incidents.

What is claimed is:

1. Method for control of an automatic transmission for a motor vehicle which is equipped with a cruise control wherein upon manual activation by the driver of the cruise control in the state "set" a change is made to a driving program for constantly keeping the velocity of the motor vehicle existing at the activation and which is given up, the same as the motor vehicle being automatically decelerated by the driver or accelerated by the driver and thereby passing over to the state "restore" characterized in that, when activating the cruise control in the "set" state, the driving program is selected from a group of driving programs as function of external influences on the motor vehicle, specially of the road inclination, and as function of a preset driving mode, that upon change of the external inferences, specially of the road inclination, one other driving program is automatically selected from the group of driving programs and that upon deactivation of the cruise control and subsequent activation of the state "restore" the transmission control can be adjusted so that the cruise control and therewith the selection of an adequate driving program are to be activated immediately or after reaching the state "set".

2. Method according to claim 1, characterized in that the road inclination is determined via a tractional resistance.

3. Method according to claim 1, characterized in that the road inclination is determined via a gradient sensor.

4. Method according to claim 1, characterized in that the road inclination is determined via a GPS.

5. Method according to one or more of the preceding claims, characterized in that when the cruise control is activated the driving activity calculation runs on line in the background without direct influence upon the selection of the driving program.

6. Method according to one or more of the preceding claims, characterized in that when the cruise control is deactivated, a pre-defined fixed driving program with only one shifting characteristic line is selected.

7. Method according to claim 6, characterized in that as pre-defined fixed driving program is selected the normal driving program closest to the last program selected before deactivation of the cruise control.

8. Method according to claim 6, characterized in that as pre-defined fixed driving program is selected the driving program with superimposed road inclination specification corresponding to the driving activity running on line in the background.

9. Method according to one or more of the preceding claims, characterized in that when activating the cruise control the driver can manually trigger an additional function for automatic setting of a directional velocity, or of an admissible velocity, or of a reduced velocity as function of data fed by the cruise control, specially by a GPS and/or an RDS.

* * * * *